US008558885B2

(12) United States Patent
Fitzgibbon

(10) Patent No.: US 8,558,885 B2
(45) Date of Patent: Oct. 15, 2013

(54) BARRIER OPERATOR SYSTEM AND METHOD WITH OBSTRUCTION DETECTION

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1458 days.

(21) Appl. No.: 11/529,889

(22) Filed: Sep. 29, 2006

(65) Prior Publication Data

US 2008/0079810 A1  Apr. 3, 2008

(51) Int. Cl.
*H04N 7/18* (2006.01)

(52) U.S. Cl.
USPC ............................................... 348/143

(58) Field of Classification Search
USPC .................................. 348/143–169
IPC ........................................... H04N 7/18
See application file for complete search history.

(56) References Cited

U.S. PATENT DOCUMENTS

| 4,874,063 | A | 10/1989 | Taylor |
| 5,001,557 | A | 3/1991 | Begle |
| 6,683,431 | B2 * | 1/2004 | Fitzgibbon et al. ............ 318/468 |
| 7,042,492 | B2 | 5/2006 | Spinelli |
| 7,200,246 | B2 * | 4/2007 | Cofer et al. .................... 382/103 |
| 7,207,142 | B2 * | 4/2007 | Mullet ............................. 49/199 |
| 7,409,076 | B2 * | 8/2008 | Brown et al. ................. 382/103 |
| 7,577,199 | B1 * | 8/2009 | Herz ......................... 375/240.16 |
| 7,664,292 | B2 * | 2/2010 | van den Bergen et al. ... 382/103 |
| 2001/0045327 | A1 * | 11/2001 | Shemanske et al. .......... 187/317 |
| 2005/0270372 | A1 * | 12/2005 | Henninger, III ............. 348/143 |

FOREIGN PATENT DOCUMENTS

WO    WO 82/01454    4/1982

OTHER PUBLICATIONS

Website: htto://www.stanleyaccesstechnologies.com/products/lit/StanVision%20Catalog%20AT2222.pdf.

* cited by examiner

*Primary Examiner* — David Czekaj
*Assistant Examiner* — Tracy Li
(74) *Attorney, Agent, or Firm* — Fitch, Even, Tabin & Flannery LLP

(57) ABSTRACT

At least one of an area to protect and an area to ignore are marked using a visual indicator. The area to protect and the area to ignore are in proximity to a moveable barrier operator system. Visual inputs from a camera representative of the visual indicator are received and evaluated to automatically distinguish between the area to protect and the area to ignore. An evaluation area of the camera is limited so as to coincide with substantially only with the area to protect. Thereafter, it is determined whether an obstruction exists in the evaluation area of the camera. The evaluation area may be recorded and used for future determinations as to whether obstructions exist in the pathway of the barrier.

23 Claims, 5 Drawing Sheets

BARRIER OPERATOR SYSTEM AND METHOD WITH OBSTRUCTION DETECTION

FIELD OF THE INVENTION

The field of the invention relates to barrier operator systems and, more specifically, to detecting obstructions in these systems.

BACKGROUND

Different types of moveable barrier operators have been sold over the years and these barrier operator systems have been used to actuate various types of moveable barriers. For example, garage door operators have been used to move garage doors and gate operators have been used to open and close gates.

Such barrier movement operators may include various mechanisms to open and close the barrier. For instance, a wall control unit may be coupled to the barrier movement operator and sends signals to a head unit thereby causing the head unit to open and close the barrier. In addition, operators often include a receiver unit at the head unit to receive wireless transmissions from a hand-held code transmitter or from a keypad transmitter, which may be affixed to the outside of the area closed by the barrier or other structure.

At times, obstructions may enter the pathways of barriers in barrier operator systems. For instance, a car or a person may enter the path of the barrier as the barrier is closing. Obstruction detection systems are used in barrier operator systems to determine whether an obstruction has entered the path of a barrier. For example, a photo detector may be used to determine whether there is an obstruction present in the pathway of the door and the movement of the door may be halted or reversed whenever an obstruction is detected.

In other examples of obstruction detection systems, an area is monitored by a video camera. The area monitored includes the pathway of a barrier and other areas outside the pathway of the barrier. In these previous systems, "obstructions" were determined to exist in the pathway of the barrier when an object entered anywhere in the field of view of the camera (i.e., whether or not the object was actually in the pathway of the barrier). Consequently, unneeded evasive actions were often performed as the result of the erroneous obstruction determinations.

In one specific example of a system that had this problem, a camera was sometimes used to monitor the area around a security gate at an entrance of a controlled area (e.g., the boarding area of an airport). While monitoring the pathway of the gate, the camera also monitored areas behind the gate (within the controlled area) and outside of the pathway of the barrier. Whenever movement was detected anywhere in the field of view of the camera, an obstruction was determined to exist. For instance, when movement was detected behind the gate (and not in the pathway of the gate), an obstruction was determined to exist when nothing was present in the pathway of the gate. Unnecessary evasive actions (e.g., stopping or reversing barrier movement) were often performed in these previous systems as a result of the false obstruction detections. Consequently, the efficiency of these systems became degraded and user frustration with the systems increased.

SUMMARY

Approaches are provided whereby a user marks an area associated with a moveable barrier system that is to be protected from obstructions. The area to be protected may include the pathway of the barrier within the system. The system distinguishes between the area to be protected and ignores other areas, thereby concentrating on detecting obstructions in the area to be protected. In so doing, the false detection of obstructions (in area of interest) is avoided and system efficiency is enhanced.

In many of these embodiments, an area to protect and/or an area to ignore are marked using a visual indicator. The area to protect and the area to ignore are in proximity to a moveable barrier operator system. Visual inputs from a camera representative of the visual indicator are received and evaluated to automatically distinguish between the area to protect and the area to ignore. An evaluation area of the field of view of the camera is limited so as to coincide with substantially only with the area to protect. Thereafter, it is determined whether an obstruction exists in the evaluation area of the camera. A description of the evaluation area may also be recorded and used for future real-time determinations as to whether obstructions exist in the pathway of the barrier.

The determination of the evaluation area by the system may be instigated by the occurrence of any number of events, for example, by a user actuating a remote control device. Furthermore, the determination of the evaluation area may be started, stopped, or halted, for example, by the user actuating appropriate inputs to the system.

The visual indicator used to mark the area of interest and/or the area to be ignored may be of any number of different types or created using a variety of techniques. For example, the visual indicator may be a manual walk-through of the area to protect area and/or the area to ignore. In another example, the visual indicator is a manual walk around of a border of the area to protect and/or the area to ignore. In still another example, the visual indicator is a physical marker that is associated with or placed around the area to protect and/or the area to ignore. If a physical marker is used, the physical marker may be of a predetermined shape, predetermined dimension, a predetermined intensity, or predetermined color. The physical marker may be formed from a wide variety of materials such as tape, paint, or string.

In still another example, a light pen or laser pointer may be used to mark the boundaries of the area to protect and/or the area to ignore. Alternatively, the light pen or laser pointer may be used in some other way to indicate the area to protect and/or the area to ignore. For instance, the light pen or laser pointer may be moved back and forth by the user to indicate an area to the system. Other examples of using these and other similar instruments for marking purposes are possible.

After an obstruction is determined to exist, an evasive action may be performed. The evasive action may include any number of actions such as halting the movement of the barrier or reversing the movement of the barrier.

In others of these embodiments, an area of interest is marked and the area of interest is in proximity to a moveable barrier operator system. A first group of visual images is obtained from a camera and the first group of visual images includes the area of interest. Subsequently, objects visually indicated by the camera to be outside of the area of interest are ignored. When the object is detected to be in the area of interest, an evasive action may be performed. The evasive action may include halting the movement of the barrier or reversing the movement of the barrier.

Thus, approaches are provided that accurately determine whether obstructions exist in protected areas or other areas of interest associated with moveable barrier operator systems. Other areas that need not be protected from obstructions are ignored when determining the existence of obstructions. Consequently, the false detection of obstructions is significantly reduced or eliminated and system performance is correspondingly enhanced.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Figure 1A:
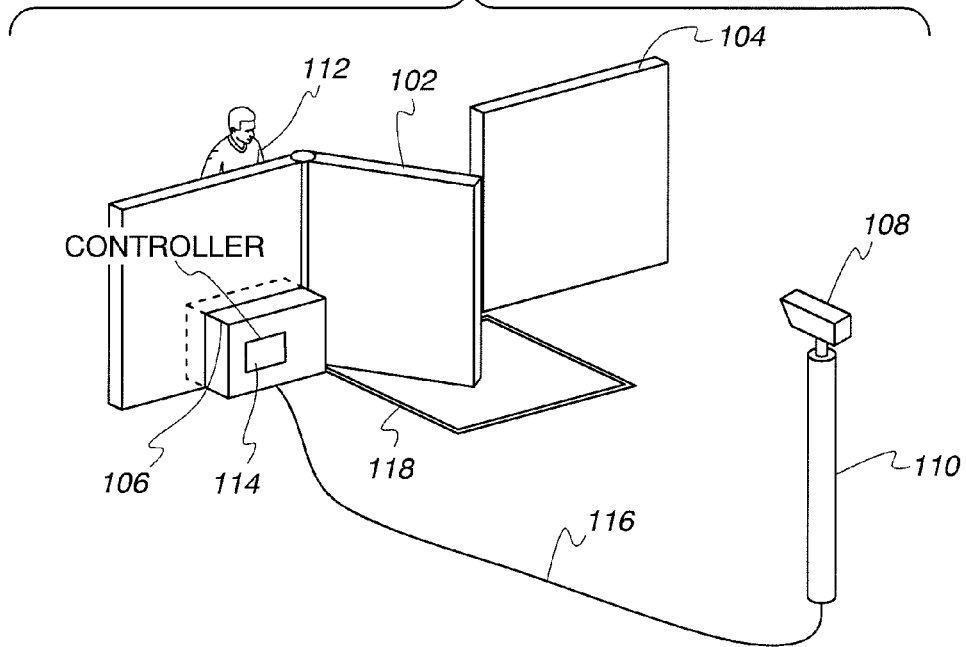
FIG. 1a is a perspective view of a system for determining whether an obstruction exists in a protected area or other area of interest according to the present invention.
Figure 1B:
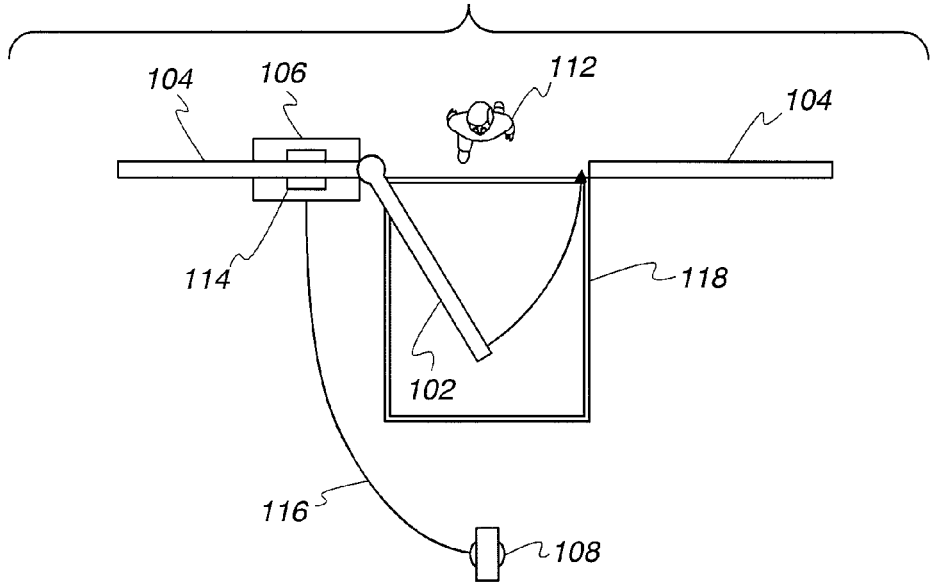
FIG. 1b is a top view of the system of FIG. 1a according to the present invention.

Referring now to the drawings and especially to FIG. 1a and FIG. 1b, a system for determining whether an obstruction is present in the pathway of a barrier is described. A barrier 102 (e.g., a gate) is coupled to a barrier operator 106 (e.g., a gate operator). The barrier 102 opens and closes and together with a wall or fence 104, alternatively allows and restricts entry to a controlled area. The barrier operator 106 includes a controller 114 and the controller 114 is programmed to move the barrier 102. Although the following description is written in terms of the barrier being a gate and the barrier operator being a gate operator it will be understood that the barrier may be any type of barrier (e.g., a garage door, sliding gate) and the barrier operator may be any type of barrier operator (e.g., a garage door operator).

A video camera 108 is positioned on top of a pole (or other structure) 110. The pole 110 can be atop the barrier operator or attached to the barrier 102. The camera 108 is positioned to monitor the barrier 102, the area in the pathway of the barrier 102, and other areas in proximity to the barrier operator system. The camera 108 is coupled to the barrier operator 106 via a cable 116. Alternatively, the camera 108 may communicate with the barrier operator 106 via an RF interface or some other communication mechanism.

A person 112 attempts to enter a controlled area that is protected by the barrier 102. Lines 118 are painted on the ground to mark the boundaries of a protected area. The camera 108 obtains video images (including the lines 118) and supplies these images to the operator 106. Using the images, the controller 114 (of the operator 106) determines an evaluation area associated with the field of view of the camera by determining the area to protect and/or the area to ignore. After being determined, the boundaries or other description of the evaluation area may be stored in a memory device for future use. Subsequently, when the evaluation area is substantially the same as the area to protect, the controller 114 may concentrate on the area to protect and determine whether obstructions are present only in the area to protect. Consequently, the system ignores objects in other areas and the determination of false obstructions is significantly reduced or eliminated.

In one example of the operation of the system of FIGS. 1a and 1b, the controller 114 receives visual inputs from the camera 108. The visual inputs include representations of a manually-formed visual indicator (e.g., the painted lines 118) that mark an area to protect and/or an area to ignore. The controller 114 is programmed to distinguish between the area to protect and the area to ignore based upon the received visual inputs. The controller 114 is also programmed to responsively limit an evaluation area of the field of view of the camera 108 so as to coincide with substantially only the protected area. The controller 114 is programmed to determine whether an obstruction exists in the evaluation area.

More specifically, visual inputs from a camera representative of the visual indicator (i.e., the lines 118) are received and evaluated by the controller 114 to automatically distinguish between the area to protect and the area to ignore. For instance, the controller 114 may include an algorithm that detects certain shapes and colors (e.g., the shape and color of the lines 118) and determines that these shapes and lines are markers. The markers are evaluated to determine the boundaries of the evaluation area (i.e., the area to protect and/or the area to ignore). In this example, the controller 114 uses the shape and color of the lines 118 to identify the area to protect (e.g., the area enclosed by the lines 118). In so doing, the evaluation area of the field of view of the camera 108 is limited so as to coincide with substantially only with the area to protect. In other examples, the evaluation area may include other areas besides the area to protect. Thereafter, it is determined whether an obstruction (e.g., the person 112) exists in the evaluation area of the camera 108. In addition, although this description is written in terms of there being a single area to protect and a single area to ignore, it will be realized that the approaches described herein may be applied to multiple areas to protect and/or multiple areas to ignore.

The boundaries/description of the evaluation area may be recorded and used by the controller 114 for future determinations as to whether obstructions exist in the pathway of the barrier. The determination of the evaluation area that is performed by the controller 114 may be instigated by any number of approaches or events, for example, by a user pressing a button on a remote control device. In addition, the determination of the evaluation area by the controller 114 may be started, stopped, or halted by the reception of various user input (e.g., the user pressing a button).

The visual indicator used to mark the area to be protected and/or the area to ignore may be any number of different types or created using various techniques. For example, the visual indicator may be a manual walk-through of the area to protect area or the area to ignore. In another example, the visual indicator is a manual walk around of a border of the area to protect or the area to ignore. In yet another example, the visual indicator is the motion of the barrier. This approach allows the system to ignore the motion of the barrier rather than considering the barrier to be an obstruction. In still another example, the visual indicator is a physical marker that is associated the area to protect and/or the area to ignore. If a physical marker is used, the physical marker may be of a predetermined shape, a predetermined dimension, predetermined intensity, or a predetermined color. The physical marker may be formed from a material such as tape, paint, or string.

In still another example, a light pen or laser pointer may be used to mark the boundaries of the area to protect and/or the area to ignore. Alternatively, the light pen or laser pointer may be used in some other way to indicate the area to protect and/or the area to ignore. For instance, the light pen or laser pointer may be moved back and forth by the user to indicate an area to protect and/or area to ignore to the system. Other examples of using these and other similar instruments for marking purposes are possible.

As mentioned, multiple areas can also be marked. These areas can be marked using the same or different approaches. For instance, one area may be marked using the motion of the barrier (as indicated above) while another area may be marked as a painted line.

After an obstruction is determined to exist, an evasive action may be performed by the operator 106. The evasive action may include any number of actions including halting the movement of the barrier 102 or reversing the movement of the barrier 102.

Figure 2A:
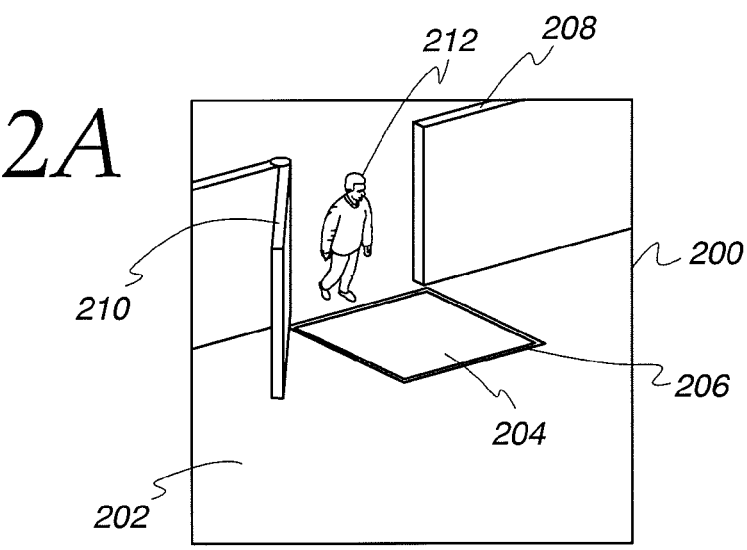
FIG. 2a is a camera image showing an area to protect and an area to ignore according to the present invention.

Referring now to FIG. 2a, one example of determining an evaluation area associated with a field of view for a camera is described. The field of view 200 of the camera includes a gate 210, a person 212, a wall 208, and a line 206 marking a protected area 204 and an area to ignore 202. In one approach, the camera obtains the image when the system is operating in a learn mode.

A set of rules or algorithms may be applied to field of view of the camera to determine the boundaries/description of the evaluation area. For instance, the evaluation area may be the same as the protected area. In other examples, the evaluation area may include designated areas outside the evaluation area.

The rules may also indicate the types of visual indicators needed to mark a protected area and/or the area to ignore. For example, it may determined whether certain shapes or colors are present on the image. In other examples, the area may be marked by having a person walk around the boundaries of the area and the system may determine the boundaries by analyzing the motion of the person performing the walk around. In another example, a person may mark the area by walking through the area and the system may determine the boundaries of the area by analyzing the movement of the person.

Figure 2B:
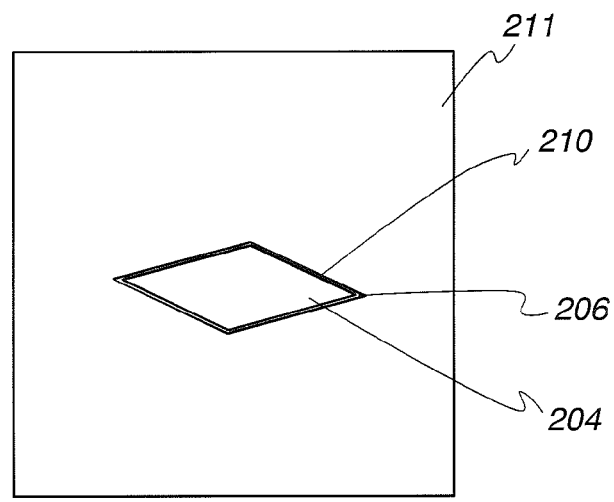
FIG. 2b is the camera image of FIG. 2a with an evaluation area according to the present invention.

Referring now to FIG. 2b, the operator is still in the learn mode and processes the image 200 to determine an evaluation area. Different approaches may be used to represent the evaluation area. Specifically, in this example, a mask 211 is formed that indicates all areas outside the evaluation area. Application of the mask 211 to a video image yields the evaluation area, which in one example is substantially the same as the area to protect. The mask 211 can be stored in a memory device for future use and application to video images.

Figure 2C:
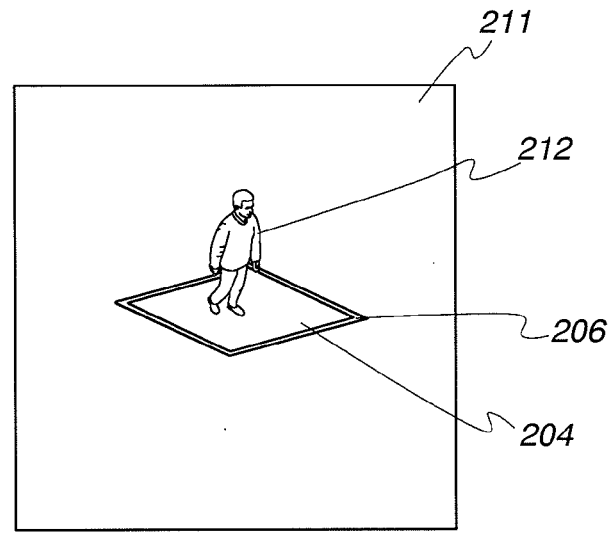
FIG. 2c is a camera image after the masking of FIG. 2b has occurred and when an object enters the evaluation area according to the present invention.

Referring now to FIG. 2c, the operator has exited the learn mode and is operating in the normal operating mode. The operator retrieves the mask 211 that has been stored in the memory. Thereafter, the operator applies the mask 211 to a present video image in order to concentrate on the protected area. Thereafter, when an object 212 enters the protected area 204, the camera detects the object. Any object in the area to ignore 202 is not considered by the operator (because it has been masked out) when determining whether an obstruction is present.

Figure 3:
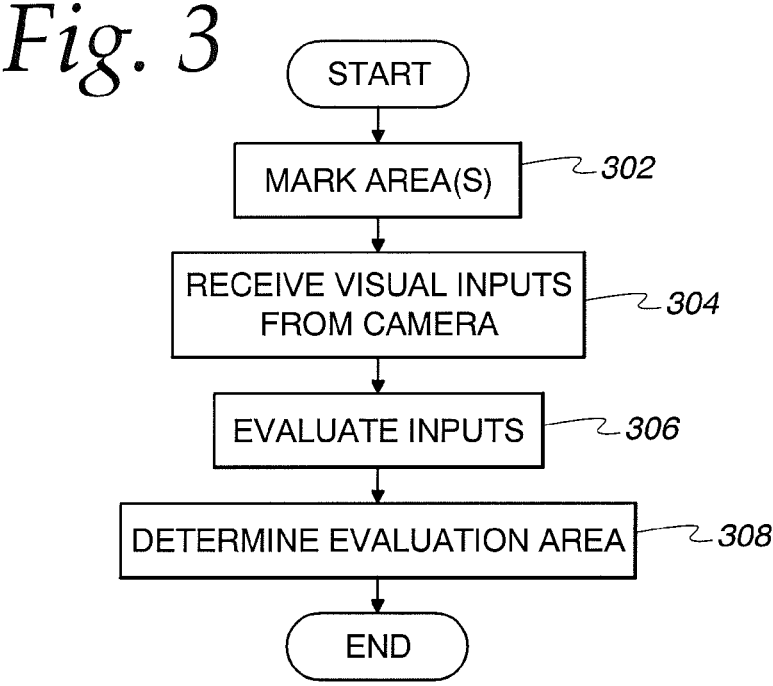
FIG. 3 is a flowchart of an approach for determining the boundaries of an evaluation area or other area of interest according to the present invention.

Referring now to FIG. 3, one example of an approach for determining whether an obstruction is present in a protected area and ignoring objects outside the protected area is described. At step 302, the area to protect and/or the area to ignore are marked. This marking may be accomplished in any number of ways. For instance, a person may walk around the boundary of one of the areas and the camera may detect this movement. In another example, the camera may detect a line that is painted around one of these areas. In still another example, a person may walk through the area to protect and the camera may detect this movement.

At step 304, the system enters a learn mode and receives the visual images from the camera. As described below, in the learn mode, the system determines the boundaries of an evaluation area. In this example, the evaluation area includes substantially only the area to protect.

At step 306, the system evaluates the inputs received from the camera. For example, when a painted line is used as the marker, the system may identify the line in the image, determine the area to protect based upon the positioning of the line, and separate the image into different areas (e.g., the area to protect and the area to ignore). The system may apply a set of rules to the image received from a user to perform the evaluation and determine the boundaries of the evaluation area. For instance, the received rules may indicate the evaluation area and protected area are to be the same. In another example, the received rules may indicate that the protected area and certain designated areas outside the protected area are to be the evaluation area.

At step 308, the system determines the boundaries/description of the evaluation area. As mentioned, in one example, the evaluation area represents the area to protect. Various approaches may be used to represent the evaluation area. For example, a mask (indicating all areas not in the evaluation area) may formed such that application of the mask to a video image yields the evaluation area.

Figure 4:
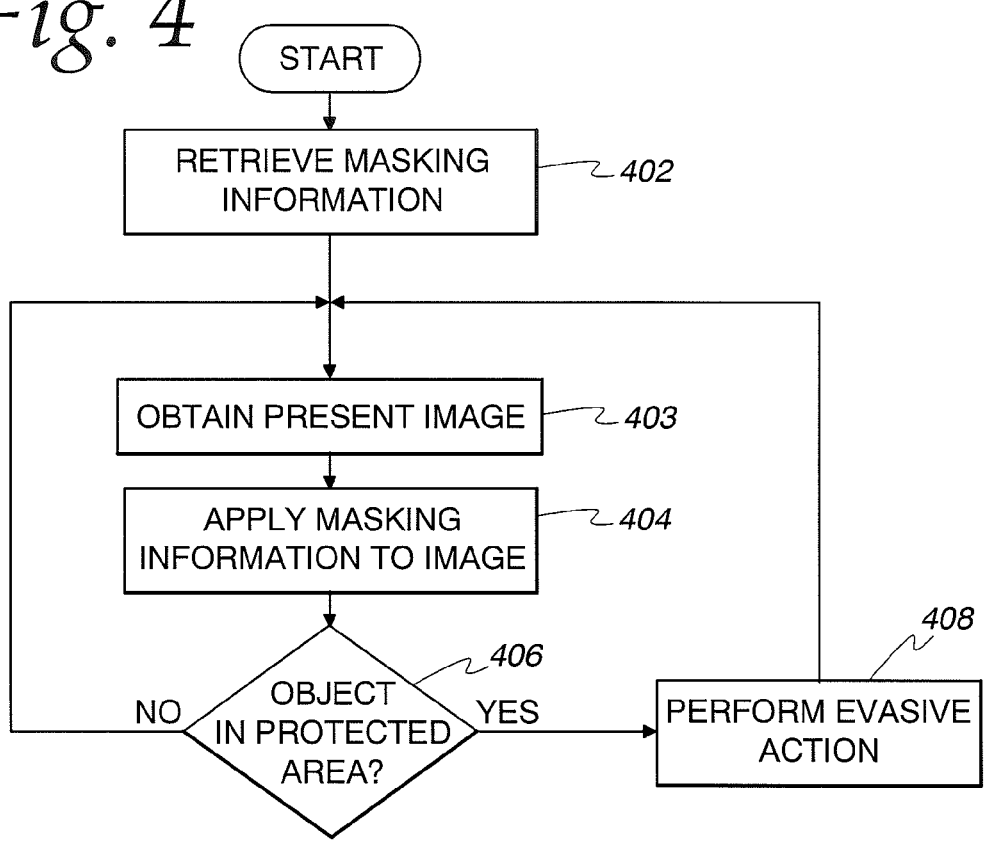
FIG. 4 is a flowchart of an approach for determining whether an obstruction is present in the evaluation area or other area of interest according to the present invention.

Referring now to FIG. 4, one example of an approach for using the stored protected area information to detect obstructions is described. In the example of FIG. 4, the system is operating in a normal mode of operation and receiving images from the camera. These images include an area to be protected from obstructions (e.g., in the pathway of the door) and other areas that are not of interest (e.g., behind or away from the area to be protected).

At step 402, a mask is retrieved from memory. The mask may include information containing the coordinates of the evaluation area. In this example, the mask defines the boundaries of the area to protect. At step 403, a present video image of areas associated with a moveable barrier operator system is returned from a camera.

At step 404, the mask is applied to the present image to mask out objects that are not located within the protected area. At step 406, after applying the mask to the present video image received from the camera, it is determined whether there is an object in the protected area. For example, it is determined if there is motion in the protected area from the images received.

If the answer at step 406 is affirmative, then at step 408 evasive action is taken (e.g., halting movement of the barrier or reversing movement of the barrier). If the answer at step 406 is negative, control returns to step 403 and the above-described steps are repeated.

Figure 5:
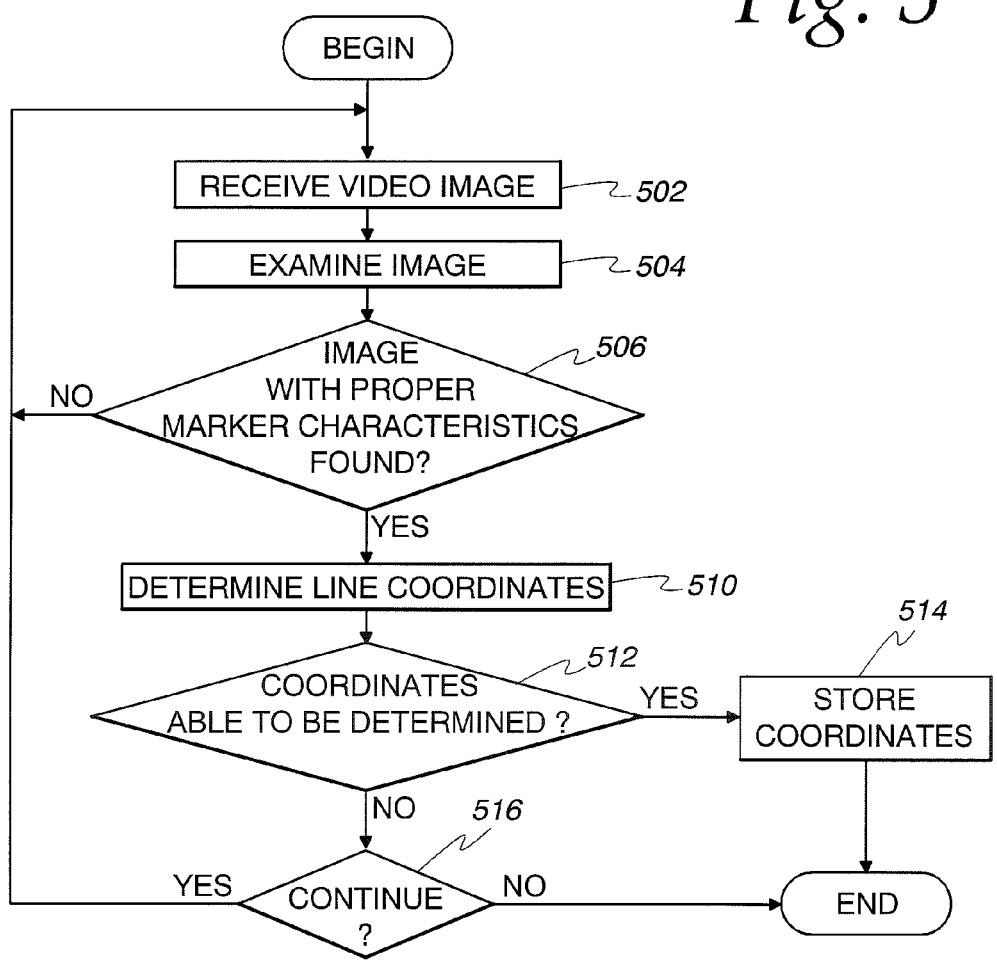
FIG. 5 is a flowchart of an approach for learning the boundaries of an evaluation area according to the present invention.

Referring now to FIG. 5, one example of an approach for learning the boundaries of an evaluation area is described. In this example the evaluation area is the same as an area to protect and is marked by a line, for instance, a line of paint. Additionally in this example, the system determines the boundaries of a single area to protect. However, it will be appreciated that there may be several areas to protect and that the system may determine any number of areas to protect.

At step 502, the system receives a video image. Included in the video image are one or more areas to be protected from the intrusion of obstructions. At step 504, the system examines the image to identify a line or lines. The lines may need to be of some predetermined color, thickness, and/or length in order for the system to determine if that an image is of a correct marker. At step 506, it is determined if an image with the proper characteristics has been found. If the answer is negative, execution continues at step 502 as described above.

If the answer at step 506 is affirmative, then execution continues at step 510. At step 510, the system determines the coordinates of the line. For example, the coordinates may be in the form of Cartesian (x,y) coordinates. At step 512, it is determined if the coordinates were able to be successfully determined. For example, the system may not have been able to determine the coordinates from the resolution or clarity of the image (e.g., the line may be hidden or the resolution of the camera may be limited). If the answer at step 512 is negative, execution continues at step 514 where the coordinates are stored in memory for future use. If the answer is negative (the boundaries of the protected area can not be determined), then execution continues at step 516 where it is determined whether the user wishes to continue to attempt to determine the area to protect (e.g., the user may wish to physically re-mark the area before continuing). If the answer at step 516 is negative, execution ends. If the answer is affirmative, then execution continues at step 502 as described above and the camera obtains a new image to evaluate.

Figure 6:
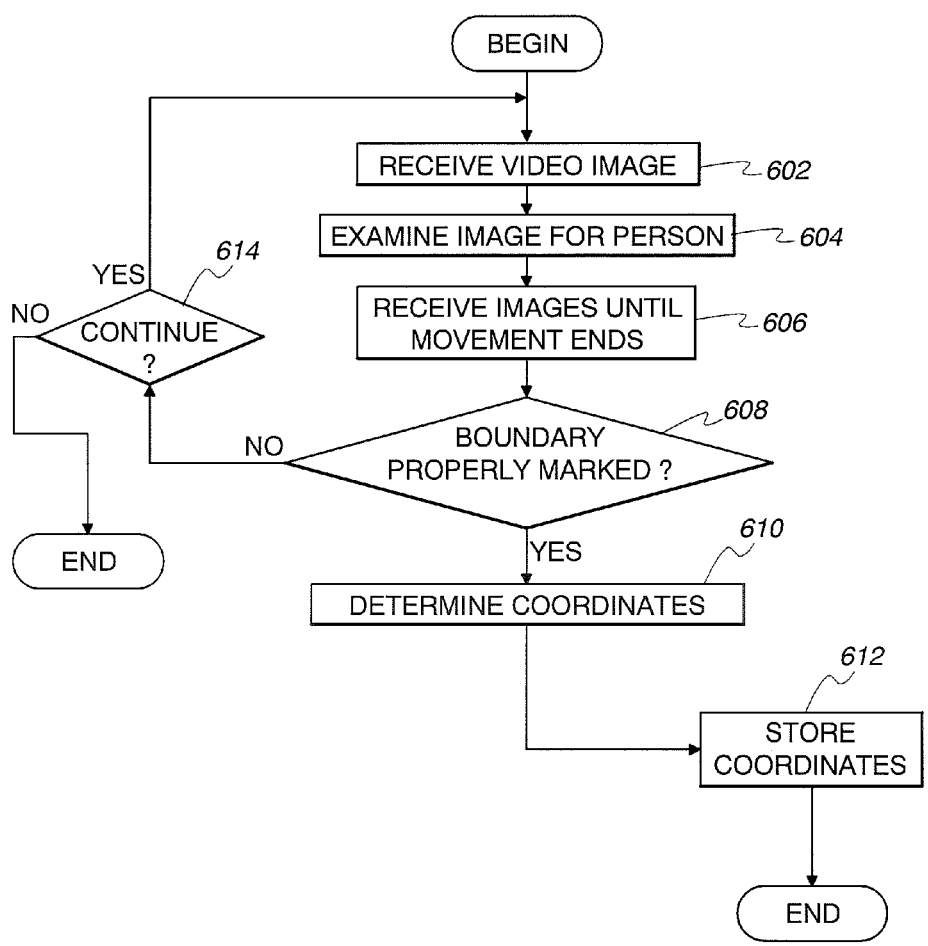
FIG. 6 is a flowchart of another approach for learning the boundaries of an evaluation area according to the present invention.

Referring now to FIG. 6, another example of an approach for learning the boundaries of an evaluation area is described. In this example, the evaluation area is the same as the area to protect and is to be marked by a human walk-though along the boundaries of the area to be protected from the intrusion of obstructions. As with the example of the approach described with respect to FIG. 5, the system determines the boundaries of a single area to protect. However, it will be appreciated that there may be several areas to protect and that the system may determine any number of areas to protect.

At step 602, the system receives a video image. In the video image are one or more areas to be protected from the intrusion of obstructions. At step 604, the system examines the image for the movement of a person (or persons). The system monitors the image for any person or persons who are performing the marking. For instance, the person who does the marking may themselves to marked with a special indicator or may speak a ceratin command to indicate they are doing the marking. At step 606, the system continues to receive images and record the movement of the person in order to determine the boundary of the area to be protected. At step 608, it is determined if the boundary has been properly marked. In this example, it may be determined if the movement defined an area (e.g., a closed shape) or did not define an area (e.g., was made in a straight line).

If the answer at step 608 is negative, then execution continues at step 614 where it is determined whether the user wishes to continue to attempt to determine the area to protect (e.g., the user may wish to physically re-mark the area before continuing). If the answer at step 614 is negative, execution ends. If the answer is affirmative, then execution continues at step 602 as described above and the camera obtains additional images to evaluate.

If the answer at step 608 is affirmative, at step 610, the system determines the coordinates of the area to be protected For example, the coordinates may be in the form of Cartesian (x,y) coordinates. At step 612, the coordinates are stored for future use. Execution then ends.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A method for detecting an obstruction in a pathway of a moveable barrier, the method comprising:
    at a first time:
        receiving and recording visual inputs from and representative of a physical visual indicator via a camera having a field of view, the field of view comprising both an area to protect and an area to ignore, wherein the physical visual indicator defines an indicated area within the field of view that corresponds to at least one of the area to protect and the area to ignore, the indicated area having a fixed location which has been visually defined by a user within the field of view, the at least one of the area to protect and the area to ignore being in proximity to a moveable barrier which is configured to be moved by a movable barrier operator having a controller programmed to move the barrier;
        evaluating the visual inputs from the physical visual indicator to determine the location of the indicated area within the field of view;
        separating the field of view into the area to protect and the area to ignore;
        determining a fixed evaluation area using the inputs representative of the physical visual indicator of the field of view that coincides with substantially only the area to protect;
        defining a mask indicating the area to ignore and storing the mask in a memory;
    at a second time:
        retrieving the mask from the memory;
        receiving an image of the field of view from the camera without the physical visual indicator;
        applying the mask to the image to mask out objects that are located outside the fixed evaluation area but within the field of view of the camera without the presence of the physical visual indicator used to define the indicated area; and
        determining whether an obstruction exists in the fixed evaluation area of the camera defined by the mask without the presence of the physical visual indicator used to define the indicated area and ignoring obstructions within the field of view but outside the fixed evaluation area.

2. The method of claim 1 comprising recording the evaluation area.

3. The method of claim 1 wherein the physical visual indicator is a user creation which is selected from the group consisting of a marking applied to a surface, a manual walk-through of the at least one of the area to protect area and the area to ignore to define at least one of the area to protect and area to ignore, and a boundary formed with a light source to define at least one of the area to protect and area to ignore.

4. The method of claim 3 wherein the evaluating comprises receiving an actuation from a remote control.

5. The method of claim 4 further comprising starting, stopping or halting the evaluating in response to receiving the actuation.

6. The method of claim 3 wherein the walk-through comprises a manual walk around of a border of at least one of the area to protect and the area to ignore.

7. The method of claim 1 wherein the physical visual indicator has a characteristic selected from the group consisting of a predetermined shape, a predetermined dimension, a predetermined intensity, and a predetermined color.

8. The method of claim 3 wherein the physical visual indicator is formed from a material selected from the group consisting of tape, paint, and string.

9. The method of claim 1 further comprising determining an evasive action to take in response to determining an obstruction exists.

10. The method of claim 9 wherein the evasive action is selected from the group consisting of halting a movement of the barrier and reversing a movement of the barrier.

11. The method of claim 1 further comprising determining coordinates of the visual indicator.

12. The method of claim 11 wherein the mask comprises the coordinates.

13. A movable barrier operator apparatus comprising:
a camera having a field of view;
a controller coupled to the camera, the controller configured to receive visual inputs from the camera and control movement of a barrier, the controller being programmed to:
at a first time
distinguish between an area to protect and an area to ignore which are fixed in a field of view of the camera and in proximity to a moveable barrier operator system based upon the received visual inputs from and representative of a manually formed physical visual indicator which visually defines the area to protect and the area to ignore fixed within the field of view of the camera;
distinguish between the area to protect and the area to ignore based upon characteristics of the manually formed physical visual indicator,
define a mask corresponding to substantially only the area to ignore to limit an evaluation area of the field of view of the camera so as to coincide with substantially only the area to protect in response to receiving the visual inputs representative of the manually formed physical visual indicator, and
store the mask in a memory and retrieve the mask from the memory,
at a second time:
receive a first group of visual images and apply the mask to the first group of visual images independent of the presence of the manually formed physical visual indicator at the second time to mask out objects outside the evaluation area but within the field of view, and
determine whether an obstruction to a pathway of the barrier exists in the evaluation area independent of the presence of the manually formed physical visual indicator at the second time.

14. The apparatus of claim 13 wherein the controller is further programmed to, in response to determining that an obstruction exists in the evaluation area, perform an evasive action at the barrier in order to avoid the obstruction.

15. The apparatus of claim 14 wherein the evasive action is an action selected from the group consisting of halting a movement of the barrier and reversing a movement of the barrier.

16. The apparatus of claim 13 wherein the manually formed physical visual indicator is selected from the group consisting of a marking applied to a surface, a human walk-through of at least one of the area to protect and the area to ignore to define at least one of the area to protect and area to ignore, and a boundary formed with a light source to define at least one of the area to protect and area to ignore.

17. The apparatus of claim 16 wherein the controller which is configured to receive the visual inputs is also configured to respond to receiving an actuation from a remote control to cause the controller to detect the formation of the physical visual indicator.

18. The apparatus of claim 17 wherein the actuation comprises starting, stopping or halting the controller detecting the formation of the physical visual indicator.

19. The of claim 16 wherein the human walk-through comprises a manual walk around of a border of at least one of the area to protect and the area to ignore.

20. The apparatus of claim 13 wherein manually formed physical visual indicator is a physical marker which has a characteristic selected from the group consisting of a predetermined shape, a predetermined dimension, a predetermined intensity, and a predetermined color.

21. The apparatus of claim 20 wherein the physical marker is made using a material selected from the group consisting of tape, paint, and string.

22. The apparatus of claim 13 wherein the barrier is selected from the group consisting of a garage door, a swinging door, a swinging gate, a sliding gate, and shutters.

23. The apparatus of claim 13 wherein the controller is further programmed to store the evaluation area in a memory for future obstruction detection.

\* \* \* \* \*